United States Patent [19]
Townsend

[11] Patent Number: 5,688,019
[45] Date of Patent: Nov. 18, 1997

[54] DOOR AND WINDOW DRIVE CLUTCH ASSEMBLY

[75] Inventor: John A. Townsend, Troy, Mich.

[73] Assignee: Joalto Design Inc., Southfield, Mich.

[21] Appl. No.: 430,527

[22] Filed: Apr. 27, 1995

Related U.S. Application Data

[60] Continuation-in-part of Ser. No. 257,080, Jun. 9, 1994, which is a division of Ser. No. 912,790, Jul. 13, 1992, Pat. No. 5,378,036.

[51] Int. Cl.[6] ........................................ B60J 5/06
[52] U.S. Cl. .................... 296/155; 296/106; 296/146.4; 49/163; 49/360
[58] Field of Search ........................... 296/106, 155, 296/146.4; 49/163, 168, 324, 348, 349, 358, 360

[56] References Cited

U.S. PATENT DOCUMENTS

| | | | |
|---|---|---|---|
| 1,864,048 | 6/1932 | McNutt | 296/155 |
| 1,940,444 | 12/1933 | Burgman | 296/107 |
| 2,160,099 | 5/1939 | Zeligman et al. | 49/40 |
| 2,324,145 | 7/1943 | Floraday | 268/124 |
| 2,622,919 | 12/1952 | Scott | 296/155 |
| 2,649,300 | 8/1953 | Launder . | |
| 2,651,541 | 9/1953 | Surles | 296/155 |
| 2,819,114 | 1/1958 | Lake | 296/155 |
| 2,829,885 | 4/1958 | Russell . | |
| 2,893,727 | 7/1959 | Barnard . | |
| 3,567,209 | 3/1971 | Lathers | 296/106 X |
| 3,645,043 | 2/1972 | Velavicius et al. | 49/106 X |
| 3,699,716 | 10/1972 | Wanlass | 49/40 |
| 3,742,646 | 7/1973 | Piech | 49/28 |
| 4,039,222 | 8/1977 | Wolf et al. . | |
| 4,331,359 | 5/1982 | Sheldon . | |
| 4,793,099 | 12/1988 | Friese et al. | 49/362 X |
| 4,801,172 | 1/1989 | Townsend | 296/155 |
| 4,940,282 | 7/1990 | Townsend | 296/204 |

FOREIGN PATENT DOCUMENTS

| | | | |
|---|---|---|---|
| 961405 | 5/1950 | France . | |
| 1 026 247 | 4/1953 | France . | |
| 895 409 | 11/1953 | Germany | 296/155 |
| 3725517 | 10/1988 | Germany | 296/155 |
| 480023 | 4/1953 | Italy . | |
| 5113074 | 5/1993 | Japan | 49/324 |
| 225087 | 4/1943 | Switzerland . | |
| 1 592 155 | 1/1978 | United Kingdom . | |
| 2 133 461 | 7/1984 | United Kingdom . | |

OTHER PUBLICATIONS

Warner Electric Drawing No. 1-25521 (3 pp.).

Primary Examiner—Dennis H. Pedder
Attorney, Agent, or Firm—Limbach & Limbach L.L.P.

[57] ABSTRACT

A vehicle door and window drive assembly is disclosed for simultaneously or independently driving a vertically moving door and its associated window between respective open and closed positions. A single prime mover, such as a reversible electric motor, a door moving mechanism, and a window moving mechanism are selectively coupled and uncoupled with each other in various combinations by three electromagnetically operated clutches to provide for synchronized manual or powered movement of the door with the window or independent door and window operation.

18 Claims, 5 Drawing Sheets

DOOR AND WINDOW DRIVE CLUTCH ASSEMBLY

This is a Continuation-In-Part of application Ser. No. 08/257,080, filed Jun. 9, 1994, pending which is a Divisional of application Ser. No. 07/912,790, filed Jul. 13, 1992, which issued as U.S. Pat. No. 5,378,036 on Jan. 3, 1995.

BACKGROUND OF THE INVENTION

1. Field of the Invention

The present invention relates to vehicle doors that vertically retract under a vehicle's floor or over a vehicle's roof when opening, and in particular to a door and window drive clutch assembly for driving a vertically moving door and an associated window between their respective open and closed positions.

2. Discussion of the Prior Art

The construction, operation, and advantages of vertically moving doors are disclosed in the parent case, application Ser. No. 07/912,790, filed Jul. 13, 1992 by John A. Townsend and entitled IMPROVEMENTS IN SLIDING AUTOMOBILE DOOR. Other general descriptions of the art can be found in U.S. Pat. No. 4,940,282, issued on Jul. 10, 1990, which is a continuation-in-part of U.S. Pat. No. 4,801,172, issued on Jan. 31, 1989, both by John A. Townsend. As opposed to conventional vehicle doors which swing outwardly on hinges, a vertically sliding door slides under or over the vehicle when opened. Among the many advantages to this type of door configuration is that a full vehicle chassis is formed when the door is closed because the door becomes an integral part of the chassis structure.

Configurations that are currently under development, as disclosed in parent application Ser. No. 07/912,790, include driver and passenger doors and station wagon tailgates that have a conventional window that retracts into the door, and the door retracts underneath the floor of the vehicle. An alternate configuration is utilized for a rear van door. A window located above the rear door retracts into the door as the door is driven up into a pocket in the roof of the van. These vertically moving doors can be operated manually, but preferably are driven by a reversible electric motor.

Previously, it has been proposed to drive the window and door individually using two separate motors. U.S. Pat. No. 4,940,282 shows in FIG. 12 a first motor 98 for raising and lowering a door, and a second motor 100 for raising and lowering the associated window. However, employing two motors increases cost, weight and complexity, and takes up valuable space in and around the door. Both motors must typically be driven when raising or lowering the door because the window must be retracted each time the door is lowered to assure that the window glass does not obstruct the door opening. In the event of an electrical power loss or motor failure, the door should be manually operable to allow ingress and egress. If the window and door operations are completely independent, manual operation becomes cumbersome or impossible. Therefore, it is desirable to synchronize the movements of the door and window, and to drive both using a single motor. However, it is desirable to also allow individual door and window operation.

SUMMARY OF THE INVENTION

According to one aspect of the present invention, synchronous and independent operations of a vertically moving door and window are alternately provided for.

According to another aspect of the present invention, the door and window are driven by a single prime mover, thereby reducing cost, weight, complexity, and size of the drive system.

According to yet another aspect of the present invention, a single prime mover means, a door drive means, and a window drive means are selectively coupled and uncoupled with each other. In the preferred embodiment, first, second and third electrically operated clutches are utilized to perform the coupling and uncoupling operations, and a reversible electric motor serves as the single prime mover means. The first clutch normally is uncoupled, and when energized couples the motor with the door drive means. The second clutch is also normally uncoupled, and when energized couples the motor with the window drive means. The third clutch normally couples the window drive means to the door drive means, and when energized it uncouples.

By energizing the first and second clutches, the door and window can be moved up or down simultaneously. By energizing the second and third clutches, the window can be driven independently from the door. By energizing the first and third clutches, the door can be driven independently from the window. When none of the three clutches are energized, the window and door are both uncoupled from the motor and are coupled to each other for manual, synchronous movement.

DETAILED DESCRIPTION OF THE PREFERRED EMBODIMENT

Figure 4:
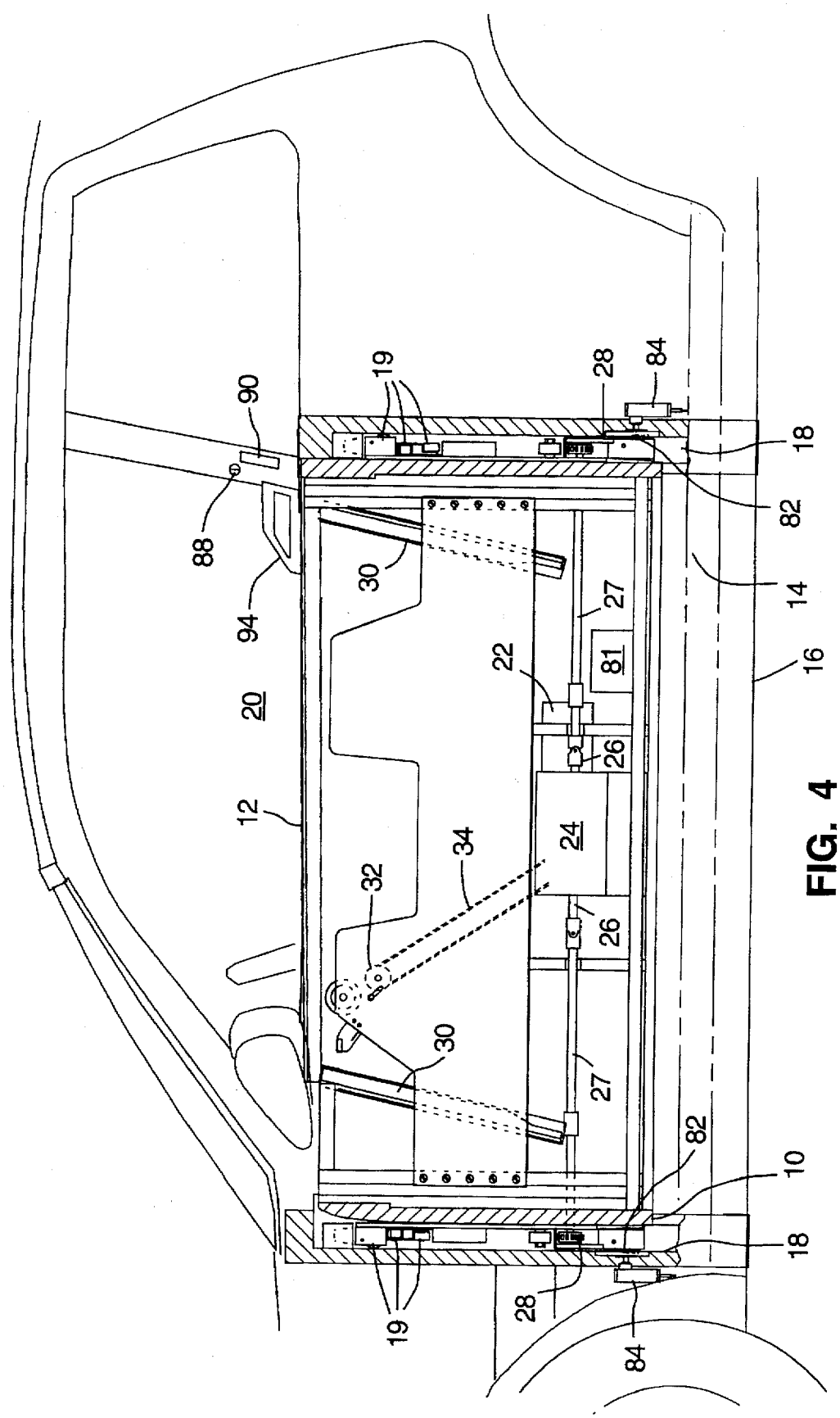
FIG. 4 is a side elevation view partially broken away showing a vertically sliding door employing the present invention.
Figure 5:
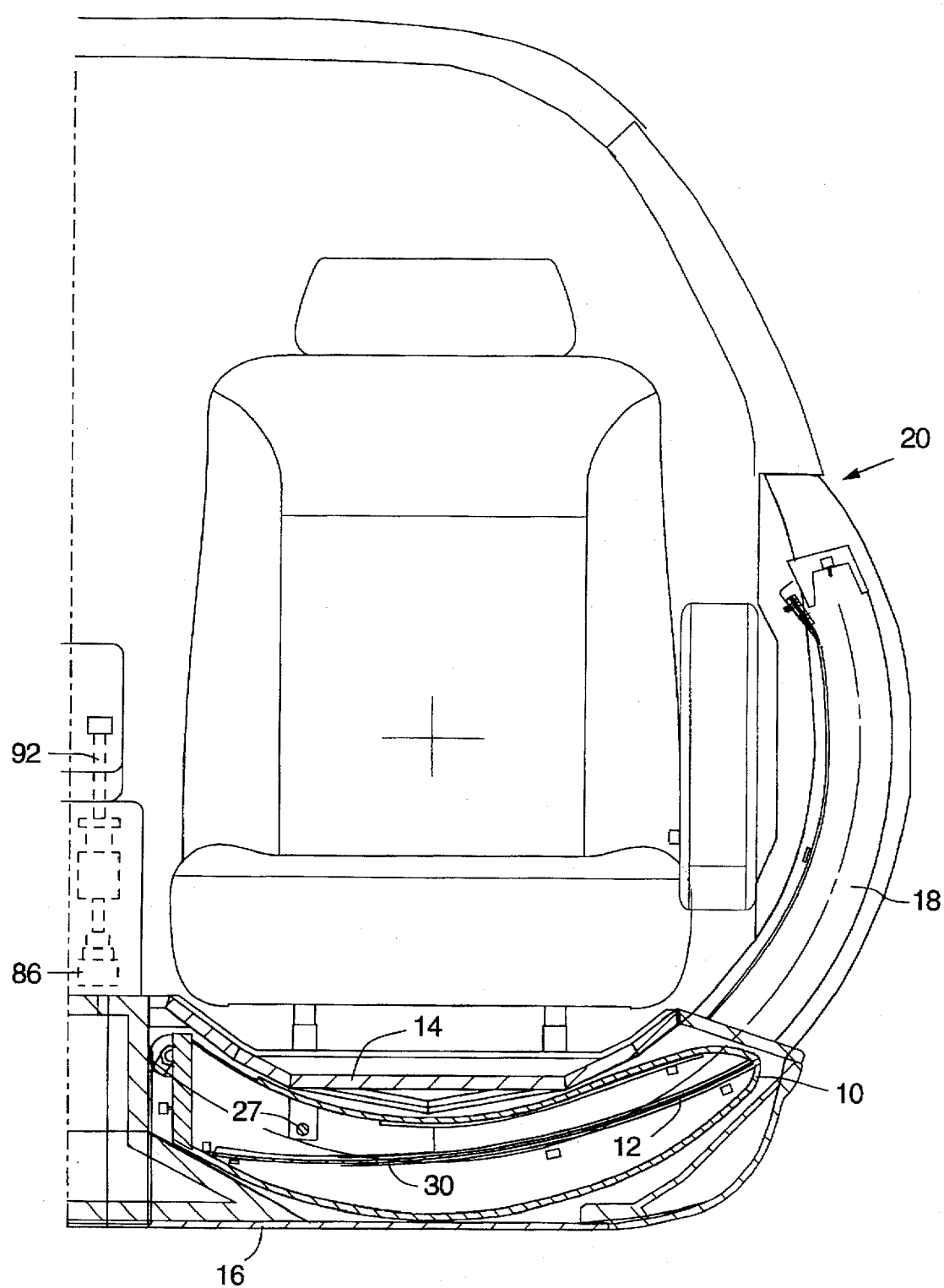
FIG. 5 is a front elevation cross-sectional view showing a vertically sliding door in a lowered position and a window retracted within the door.
Figure 6:
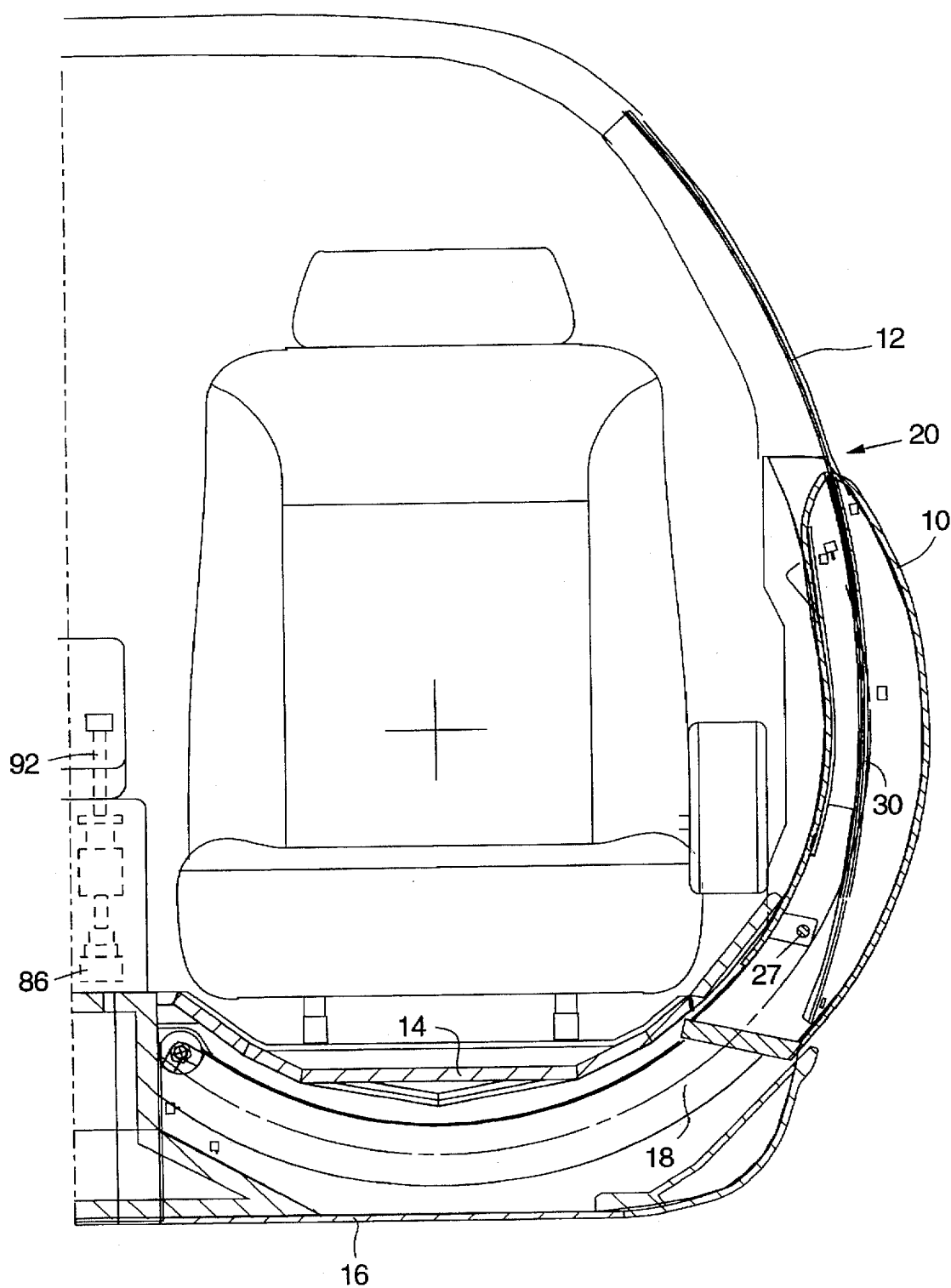
FIG. 6 is a front elevation cross-sectional view showing a vertically sliding door in a raised position and a window extended therefrom.

Referring first to FIGS. 5 and 6, a vertically moving door 10 and associated window 12 are shown in the open and closed positions, respectively. FIG. 5 shows the door 10 lowered into a compartment between the vehicle floor 14 and belly pan 16. In this open position, window 12 is received within door 10. Door 10 is constrained longitudinally between a pair of longitudinally spaced, curvilinear door tracks 18 (as shown in FIGS. 4–6). Door 10 is guided along door tracks 18 by rollers 19 (some of which are shown in FIG. 4) so as to be movable between the lowered position shown in FIG. 5 to the raised position shown in FIG. 6. Window 12, which is carried by vertically movable door 10, extends upward from door 10 to close the top portion of door opening 20. With door 10 raised and window 12 extended, door 10 and window 20 cooperate to cover the door opening 20. Preferably, window 12 is driven into the extended position at the same time that door 10 is driven into the raised position, and window 12 is driven into the retracted position at the same time door 10 is driven into the lowered position.

Referring to FIG. 4, the preferred components for driving door 10 and window 12 are shown. A single, reversible electric motor 22 drives both door 10 and window 12 in both directions. Alternatively, the prime mover could be a hydraulic or pneumatic motor or cylinder, a hand-operated crank for manual use, or some other suitable prime mover to raise and lower door 10. The motor need not be reversible if a suitable mechanism is provided to reverse the direction of drive.

In the preferred embodiment, motor 10 is mounted on housing 24, which in turn is mounted within and is movable with door 10. An output shaft 26 extends from both the fore and aft ends of housing 24 to drive door 10 up or down. Each end of output shaft 26 is connected to a door drive shaft 27, which work in unison to each drive one end of door 10. A sprocket 28 is affixed to the outboard end of each door drive shaft 27. As the pair of sprockets 28 are driven by the rotation of door drive shafts 27, sprockets 28 climb or lower along an associated flexible, perforated tape located along the length of each door track 18 (shown in FIGS. 5 and 6), and thereby raise or lower door 10. Alternatively, cable or gear arrangements could be used instead of perforated tape. The perforated tape system is more fully described in the parent application, Ser. No. 07/912,790.

Window 12 is constrained from moving fore and aft by window guides 30. A standard window mechanism (not shown) is used to raise and lower window 12 within guides 30. A standard manual window crank (not shown) is replaced by a cable pulley 32 inside door 10. Cable pulley 32 is driven by cable 34, which in turn is driven by motor 22 through housing 24, as will be later described. Preferably, cable 34 is sheathed, as shown in FIGS. 1 and 2 by sheath 72, so that cable 34 is not required to follow the direct path shown in FIG. 4 between cable pulley 32 and housing 24.

Figure 1:
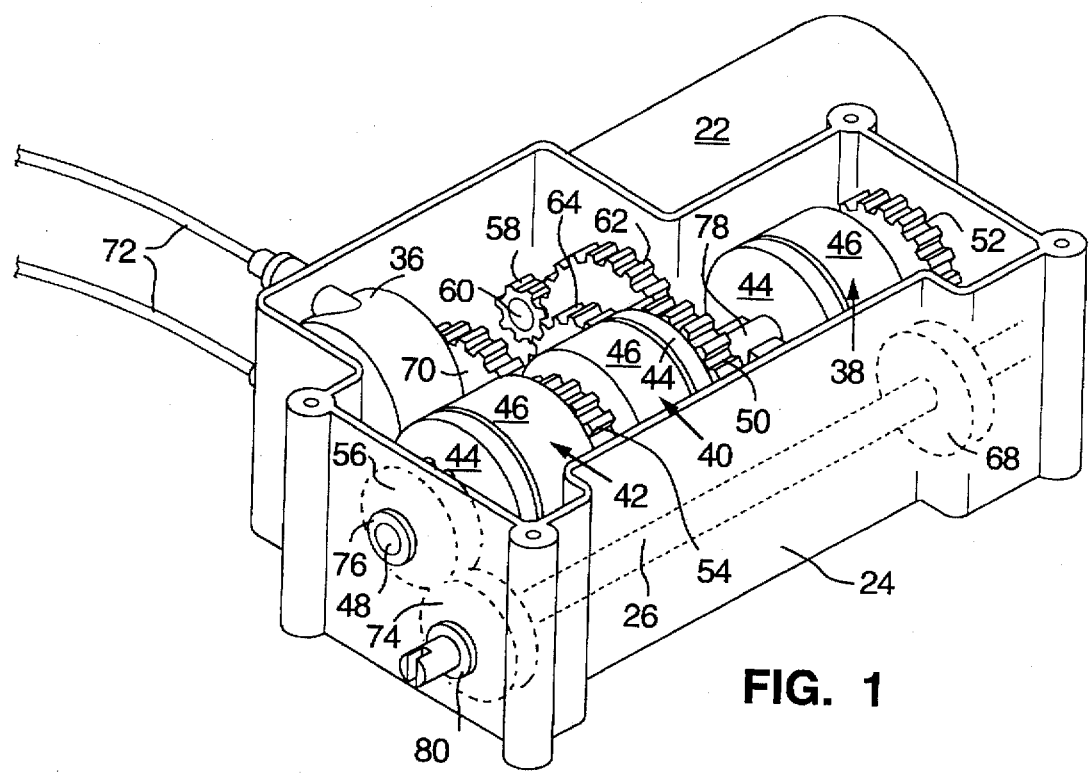
FIG. 1 is a perspective view showing the clutch housing of the present invention.
Figure 2:
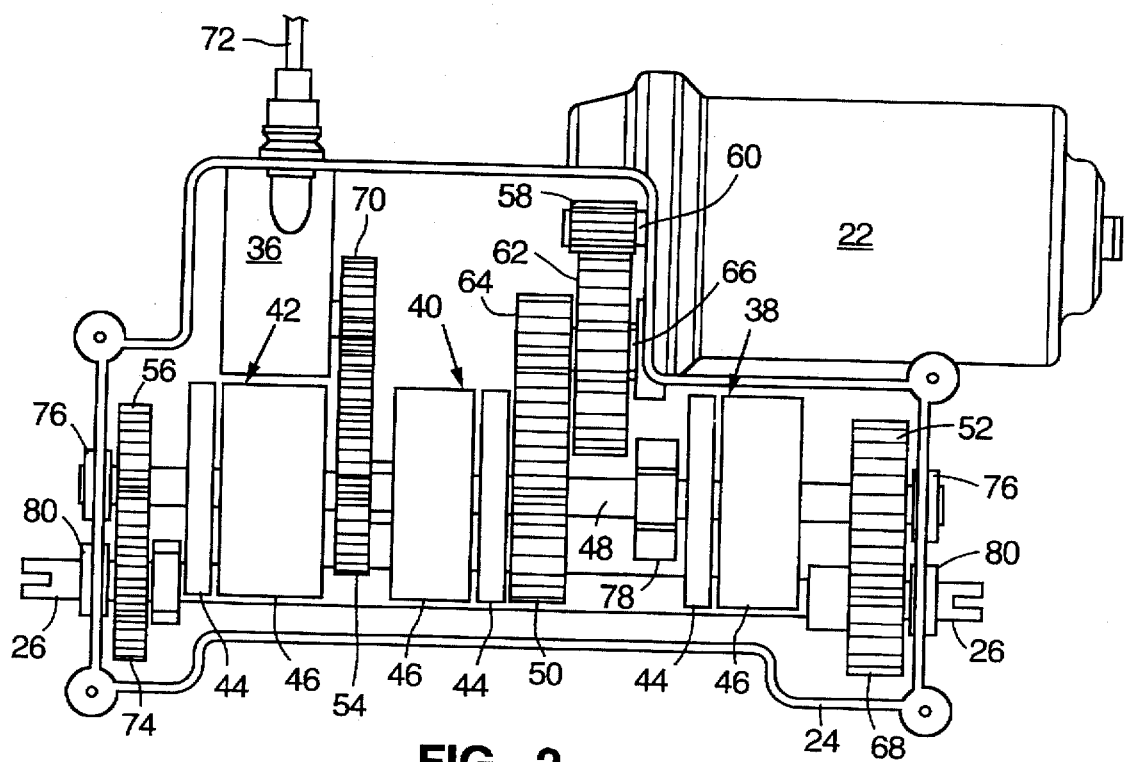
FIG. 2 is a plan view showing the clutch housing of the present invention.

Referring now to FIGS. 1 and 2, the construction of the door and window drive clutch assembly will be described. With housing cover (not shown) removed from housing 24, the drive train can be seen which interconnects motor 22, door drive output shaft 26, and window cable drive unit 36 in various combinations.

The inventive drive train includes a first clutch 38, a second clutch 40, and a third clutch 42. Each clutch includes a first stage 44 and a coaxially aligned second stage 46, which are capable of independent rotation. The first stage 44 of each clutch is selectively coupled to the associated second stage 46 by way of an electromagnet (not shown). When coupled, clutches 38, 40, 42 transmit rotational power between their first stage 44 and their second stage 46. The first clutch 38 and second clutch 40 are normally uncoupled, and become coupled when electrical power is supplied to their respective electromagnets. The third clutch is normally coupled, and becomes uncoupled when electrical power is supplied to its electromagnet.

All three clutches 38, 40 and 42 are concentrically aligned on main shaft 48, as are input gear 50, door drive gear 52, window drive gear 54 and interconnect gear 56. Input gear 50 and the first stage 44 of both the first clutch 38 and second clutch 40 are rigidly connected to the main shaft 48 to rotate concurrently therewith. However, the remaining gear train components mounted on main shaft 48 are not fastened to main shaft 48 and therefore rotate independently from it.

The second stage 46 of the first clutch 38 is rigidly connected to the door drive gear 52 (such a by a common hollow sleeve over main shaft 48) to rotate concurrently with door drive gear 52. Similarly, window drive gear 54 is rotationally connected to the second stage 46 of both the second clutch 40 and third clutch 42, and the interconnect gear 56 is rotationally connected to the first stage 44 of the third clutch 42.

Motor pinion 58 is fastened to motor shaft 60. Idler gear 62 and idler pinion 64 are rigidly attached together and rotationally mounted on idler shaft 66. Motor pinion 58 meshes with idler gear 62, and idler pinion 64 meshes with input gear 50, thereby transmitting rotational power from motor shaft 60 to main shaft 48. Door drive gear 52 meshes with output shaft gear 68, thereby transmitting rotational power from first clutch 38, when energized, to output shaft 26 to drive door 10 as previously described. Window drive gear 54 meshes with cable drive unit gear 70, thereby transmitting rotational power from the second clutch 40, when energized, or the third clutch 42, when de-energized, to window cable drive unit 36. Window cable drive unit 36 drives window 12 as previously described by alternately pulling cable 34 longitudinally through cable sheaths 72. Interconnect gear 56 meshes with output shaft gear 74 to rotationally connect output shaft 26 to window cable drive unit 36 when third clutch 42 is de-energized.

Both ends of main shaft 48 are supported by bearings 76 in housing walls 24, and a mid-portion of main shaft 48 is supported by bearing 78. Similarly, both ends of output shaft 26 are supported by bearings 80.

In summary, to operate door 10, output shaft 26 can be driven in either direction by motor 22 through gears 58, 62, 64, 50, energized first clutch 38, and gears 52 and 68, in that order. To operate window 12, cable drive unit 36 can be driven in either direction by motor 22 through gears 58, 62, 64, 50, energized second clutch 40, and gears 54 and 70, in that order. To interconnect the motion of door 10 with that of window 12 for manual operation without motor 22, window cable drive unit 36 can be driven in either direction by output shaft 26 through gears 74 and 56, de-energized third clutch 42, and gears 54 and 70, in that order.

Suitable ratios are utilized in the drive train and in the door and window operating mechanisms so that when both door 10 and window 12 are simultaneously driven by motor 22 from the lowered and retracted positions, respectively, door 10 reaches the fully raised position at the same time that window 12 reaches the fully extended position. In other words, door 10 and window 12 can be opened and closed together, without the need for operating any clutches during the procedure. This synchronization of door 10 travel with window 12 travel ensures that window 12 is retracted when door 10 is opened manually. This arrangement also speeds the opening and closing of door 10 when window 12 is extended.

Figure 3A:
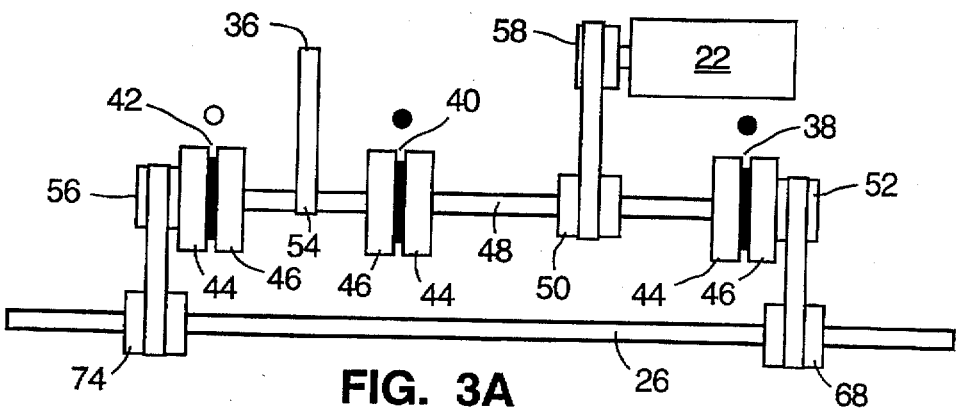
FIG. 3A is a schematic representation of a mode wherein a motor drives a door and window simultaneously.
Figure 3B:
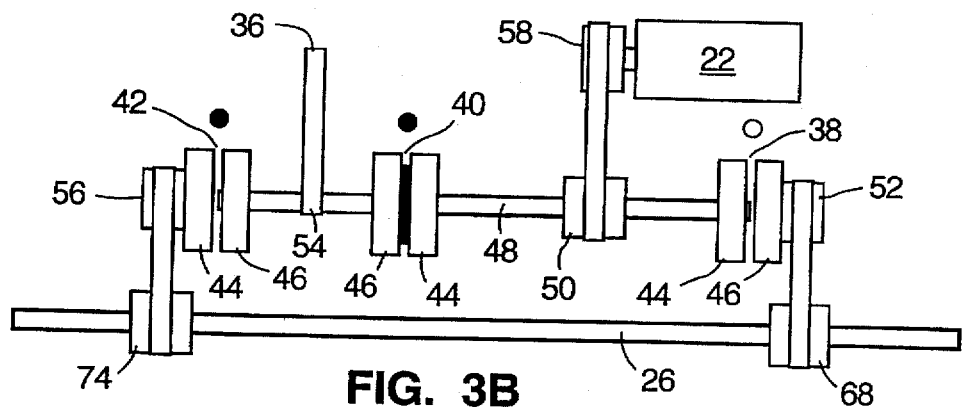
FIG. 3B is a schematic representation of a mode wherein a motor drives a window independently from a door.
Figure 3C:
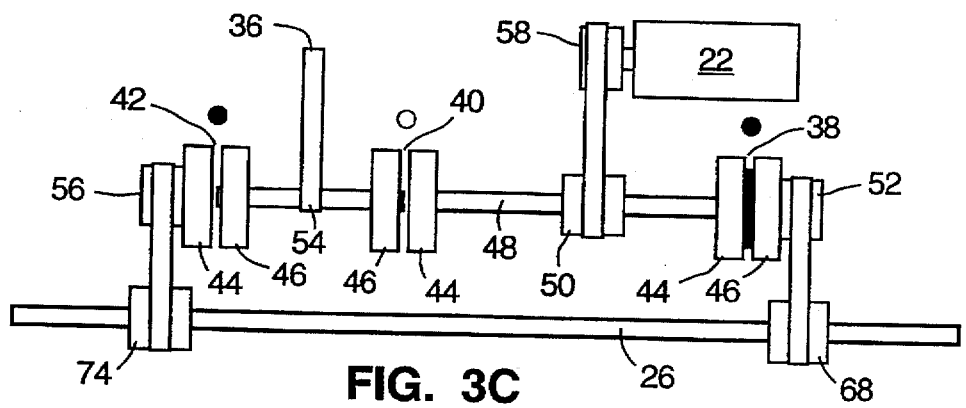
FIG. 3C is a schematic representation of a mode wherein a motor drives a door independently from a window.
Figure 3D:
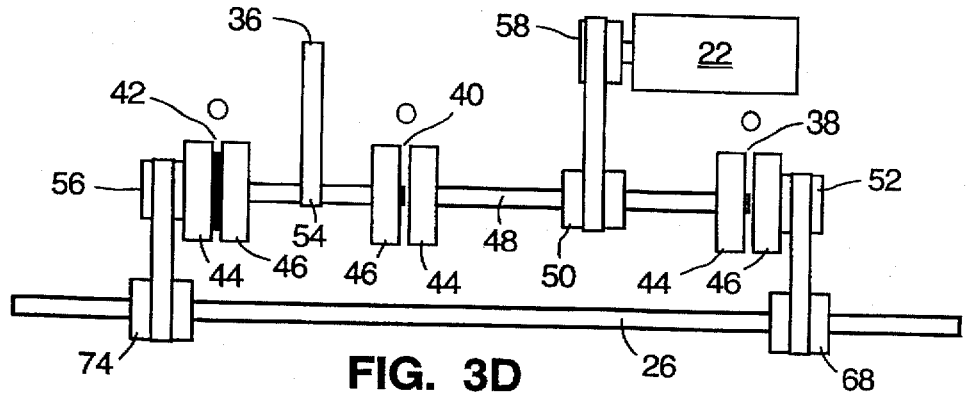
FIG. 3D is a schematic representation of a mode wherein a motor is uncoupled from a door and window and wherein the door and window are coupled for manual, simultaneous movement.

Referring now to FIGS. 3A–3D, the operating modes of the door and window drive train will be described. FIG. 3A schematically represents the drive train in a mode for driving both door 10 and window 12 simultaneously. FIG. 3B represents the drive train in a mode for driving window 12 independently from door 10, and FIG. 3C represents a mode for driving door 10 independently from window 12. FIG. 3D represents the drive train in a power off mode for manual movement of the door and window simultaneously. In FIGS. 3A–3D, a blackened circle above clutch 38, 40 or 42 indicates that that clutch is energized. For first clutch 38 and second clutch 40, a blackened circle is accompanied by a filled space between the first stage 44 and second stage 46, indicating that the two stages are coupled when the clutch is energized. For the third clutch 42, a blackened circle is accompanied by an empty space between the first stage 44 and second stage 46, indicating that the two stages are uncoupled when the clutch is energized.

Referring first to FIG. 3A, first clutch 38 and second clutch 40 are energized and motor 22 is energized in a forward or reverse direction by an electronic controller 81 (shown in FIG. 4) in response to a signal to open or close the door 10 and window 12 simultaneously. Because first clutch 38 is energized (and therefore coupled), power from motor 22 is transferred to output shaft 26 to drive door 10. Similarly, since second clutch 40 is energized (and therefore also coupled), power from motor 22 is transferred to window cable drive unit 36 to drive window 12. In this mode, third clutch 42 can be either energized or de-energized. When de-energized (and therefore coupled) as shown in FIG. 3A, third clutch 42, in addition to first clutch 38, supplies power from motor 22 to output shaft 26.

This simultaneous door and window operating mode is enabled when door 10 is in the fully lowered position and window 12 is in the fully retracted position (as shown in FIG. 5), or door 10 is in the fully raised position and window 12 is in the fully extended position (as shown in FIG. 6). In the preferred embodiment, limit sensors (not shown) are employed to indicate to controller 81 when door 10 and window 12 are in one of the above configurations, and signal controller 81 when door 10 and window 12 have reached the opposite configuration so that motor 22 can then be de-energized. Alternatively, or in combination with limit switches, controller 81 can contain circuitry to count pulses from motor 22 or an encoder (not shown) to detect the position of door 10 and or window 12.

Referring next to FIG. 3B, second clutch 40 and third clutch 42 are energized and motor 22 is energized in a forward or reverse direction by controller 81 in response to a signal to open or close window 12 independently from door 10. Because second clutch 40 is energized (and therefore coupled), power from motor 22 is transferred to window cable drive unit 36 to drive window 12. Because first clutch 38 is not energized (and therefore is uncoupled), and third clutch 42 is energized (and therefore is also uncoupled), output shaft 26 is disconnected from motor 22 and window cable drive unit 36 and therefore door 10 is not driven.

This independent window operating mode is enabled when door 10 is in the fully raised position (as shown in FIG. 6). This allows a vehicle occupant to move window 12 into a fully open position, a fully closed position, or somewhere in between in a normal fashion when door 10 is closed. The controller 81, however, inhibits window 12 from being independently operated when door 10 is open, so as to prevent window 12 from extending above floor 14 (shown in FIG. 5) without door 10, which would inhibit egress and ingress to the vehicle and would subject window 12 to possible breakage.

Referring next to FIG. 3C, first clutch 38 and third clutch 42 are energized and motor 22 is energized in a forward or reverse direction by controller 81 in response to a signal to open or close door 10 independently from window 12. Because first clutch 38 is energized (and therefore coupled), power from motor 22 is transferred to output shaft 26 to drive door 10. Because second clutch 40 is not energized (and therefore is uncoupled), and third clutch 42 is energized (and therefore is also uncoupled), window cable drive unit 36 is disconnected from motor 22 and output shaft 26 and therefore window 12 is not driven.

This independent door operating mode is enabled when door 10 is in the fully raised position (as shown in FIG. 6) and window 12 is in the fully retracted position (as shown in FIG. 5). This allows a vehicle occupant to lower door 10 to open it without first having to extend window 12 into the closed position. The controller 81, however, inhibits door 10 from being independently operated when window 12 is not retracted, so as to prevent window 12 from extending above floor 14 when door 10 is lowered (as shown in FIG. 5), which again would inhibit egress and ingress to the vehicle and would subject window 12 to possible breakage. When door 10 is in the raised position (as shown in FIG. 6) and window 12 is not completely retracted, the independent window operating mode described above can be enabled by controller 81 to first fully retract window 12 before door 10 is then independently lowered. The independent door operating mode would also be used if controller 81 were configured to allow a vehicle occupant to close door 10 without simultaneously closing window 12.

Unlike the independent window operating mode, both the independent door operating mode and the simultaneous door and window operating mode do not stop in mid-travel. Once controller 81 receives a signal to raise or lower door 10 in either of these two modes, door 10 is driven until it (and therefore window 12 also) is in a fully raised or fully lowered position. Safety devices of course can be implemented to stop the travel of door 10 and window 12 when an object is detected, such as a portion of a person's body, that is obstructing the travel of door 10 and or window 12.

Referring next to FIG. 3D, all three clutches 38, 40 and 42 are de-energized, such as when there is an electrical power failure and the door must be operated manually. Because first clutch 38 and second clutch 40 are de-energized (and therefore uncoupled), both output shaft 26 and window cable drive unit 36 are disconnected from motor 22, thereby allowing door 10 and window 12 to be manually moved without the resistance of having to manually turn motor 22. Because third clutch 42 is also de-energized (and therefore coupled), window cable drive unit 36 is connected to output shaft 26 to synchronize the travel of window 12 with the travel of door 10. Therefore, when door 10 is manually lowered, window 12 automatically retracts to allow egress and ingress to the vehicle. Similarly, when door 10 is manually raised, window 12 automatically extends to fully close door opening 20 (as shown in FIG. 6).

Referring now to FIG. 4, door 10 and window 12 can be manually lowered by first releasing door latches 82 located on both ends of door 10. Door latches 82 are automatically spring engaged when door 10 is fully closed, and are released by plungers 84. Plungers 84 in turn are cable operated, and are normally actuated by an electric solenoid 86 (shown in both FIGS. 5 and 6). Solenoid 86 is energized by controller 81 when lowering door 10 in response to an interior switch (not shown), an exterior key switch 88, or a remote control (not shown). For manual operation (without electrical power), door 10 can be released by exterior lever 90 (which can be locked) or by interior lever 92 (shown in both FIGS. 5 and 6). Both levers 90 and 92 operate plungers 84 by cable.

Once door 10 is released as described above, it can be lowered and raised manually by using handle 94. Door 10 does not drop under its own weight because counterbalancing springs or air cylinders (not shown) located beneath door 10 balance the door for easy manual or motor powered raising and lowering. Because the drive train clutches 38, 40 and 42 are in the de-energized state shown in FIG. 3D, motor 22 does not have to be manually driven, and window 12 moves in synchronization with door 10.

Cable drive 36 includes a slip clutch to allow the cable 36 to slip during manual operation of the door if the window reaches the end of travel in the open direction prior to the time the door reaches the fully open condition. This enables the door and window to be manually moved to the fully open condition in the event of a power failure when the door is closed and the window is part way open. Clutches of this type are known. See, for example, U.S. Pat. No. 2,829,885. An example of the type of clutch used with the present invention is the Warner Electric bearing mounted clutch shown in its Drawing No. 1-25521.

In the preferred embodiment, motor 22, clutches 38, 40, 42, output shaft 26, window cable drive unit 36, cable 34, cable sheaths 72, and all interconnecting gears and shafts shown in FIGS. 1 and 2 are pre-assembled on housing 24 to form a single unit. This allows the majority of the door and window drive train to be installed in door 10 at one time, and provides for simple bench repair or replacement of this portion of the drive system.

In the preferred embodiment, controller 81 is a custom designed integrated circuit card, of a type well known in the art, that receives control input signals from operator switches and remote controls, and position input signals from motor 22 and limit switches associated with door 10 and window 12. Based on these inputs, controller 81 outputs signals to operate clutches 38, 40 and 42, motor 22, and solenoid 86 to coordinate the movement of door 10 and window 12 in the desired mode. Controller 81 can be mounted separately within door 10, as shown in FIG. 4, or integrated with housing 24. Alternately, controller 81 can be mounted directly on the vehicle so that it does not move with door 10. The functioning of all of the doors in a vehicle can be controlled by a single controller, or each door may be controlled by a separate controller. The controller could be as simple as a circuit composed of ordinary wiring and electrical contacts, or conceivably the above described controller functions could be performed solely or in part by mechanical means.

The above described door and window drive train is preferably used in conjunction with the vertically moving door type shown in FIGS. 4–6. However, the inventive system readily lends itself to use also with vertically sliding vehicle doors or tailgates of differing configurations, such as a rear door and window that retract into a roof, as disclosed in the parent application, Ser. No. 07/912,790. The window described above need not be a conventional glass window, but can instead be a secondary door panel, such as of metal or plastic.

While the present invention is disclosed by reference to the examples and preferred embodiment detailed above, it is to be understood that this embodiment is intended in an illustrative rather than limiting sense, as it is contemplated that modifications will readily occur to those skilled in the art, which modifications will be within the spirit of the invention and the scope of the appended claims.

I claim:

1. A vehicle door moving apparatus for use in driving a vertically sliding door between a closed position covering a portion of a door opening and an open position exposing the door opening in conjunction with driving a window panel relative to the door between an extended position covering a remaining portion of the door opening not covered by the door in the closed position and a retracted position exposing at least part of the remaining portion, the apparatus comprising:

single prime mover means for providing power to move the door between the closed and open positions and to move the window panel between the extended and retracted positions;

door drive means for directing the power from the single prime mover means to move the door;

window drive means for directing the power from the single prime mover means to move the window panel; and clutch means for selectively coupling and uncoupling the single prime mover means to the door and window drive means such that the door and window panel can be moved simultaneously or independently by the single prime mover means.

2. A vehicle door moving apparatus according to claim 1 wherein the clutch means further comprises:

a first clutch for alternately coupling and uncoupling the prime mover means to the door drive means; and a second clutch for alternately coupling and uncoupling the prime mover means to the window drive means.

3. A vehicle door moving apparatus according to claim 2 wherein the first and second clutches can be engaged simultaneously to allow the single prime mover means to move the window panel from the extended position to the retracted position while moving the door from the closed position to the open position, and alternately move the window panel from the retracted position to the extended position while moving the door from the open position to the closed position.

4. A vehicle door moving apparatus according to claim 2 wherein the second clutch can be engaged without the first clutch being engaged to allow the single prime mover means to move only the window panel while keeping the door stationary in the closed position.

5. A vehicle door moving apparatus according to claim 2 wherein the first clutch can be engaged without the second clutch being engaged to allow the single prime mover means to move only the door while keeping the window panel in the retracted position.

6. A vehicle door moving apparatus according to claim 2 wherein the clutch means further comprises:

a third clutch for alternately coupling and uncoupling the door drive means to the window drive means.

7. A vehicle door moving apparatus according to claim 6 wherein the third clutch can be engaged without the first and second clutches being engaged to allow the door and window panel to be moved simultaneously without moving the single prime mover means.

8. A vehicle door moving apparatus according to claim 1 wherein the window panel is received inside the door when in the retracted position and travels with the door and the door moves below a vehicle floor when in the open position.

9. A vehicle door moving apparatus according to claim 1 wherein the single prime mover means is a reversible electric motor.

10. A vehicle door moving apparatus according to claim 6 wherein the first, second and third clutches are electrically operated clutches.

11. A vehicle door moving apparatus according to claim 10 wherein the first and second clutches are normally uncoupled and become coupled when an electrical current is supplied, and wherein the third clutch is normally coupled and becomes uncoupled when an electrical current is supplied.

12. A vehicle door moving apparatus for use in driving a vertically sliding door between a raised position and lowered position in conjunction with driving a window between an extended position and a retracted position relative to the door, wherein the door covers a portion of a door opening when in the raised position and is stowed below a vehicle floor exposing the door opening when in the lowered position, and wherein the window is located on and is movable with the door and retracts within the door when in the retracted position, the window cooperating with the door to cover the entire door opening when the door is in the raised position and the window is in the extended position, the apparatus comprising:

- single prime mover means for providing power to move the door between the raised and lowered positions and to move the window between the extended and retracted positions;
- door drive means for directing the power from the single prime mover means to move the door;
- window drive means for directing the power from the single prime mover means to move the window;
- a first electric clutch which is normally uncoupled but which couples the prime mover means to the door drive means when an electrical current is supplied to the first electric clutch;
- a second electric clutch which is normally uncoupled but which couples the prime mover means to the window drive means when an electrical current is supplied to the second electric clutch; and
- a third electric clutch which normally couples the door drive means to the window drive means but which uncouples when an electrical current is supplied to the third electric clutch.

13. A vehicle door moving apparatus according to claim 12 wherein the single prime mover means is a reversible electric motor which can be alternately energized in either direction.

14. A vehicle door moving apparatus according to claim 12 further comprising four alternating modes:

- a door and window driving mode wherein the first and second clutches are simultaneously energized to allow the single prime mover means to raise the door and extend the window simultaneously and alternately lower the door and retract the window simultaneously;
- a window driving mode wherein the second and third clutches are energized and the first clutch is not energized to allow the single prime mover means to move only the window without the door;
- a door driving mode wherein the first and third clutches are energized and the second clutch is not energized to allow the single prime mover means to move only the door without the window; and
- a manual mode wherein none of the first, second or third clutches are energized so as to couple the door drive means with the window drive means while uncoupling the single prime mover means from both, thereby allowing the door and window to be simultaneously opened manually without resistance from the single prime mover means.

15. A vehicle door moving apparatus according to claim 14 wherein the apparatus only enters the door and window driving mode when the door is in the lowered position and the window is in the retracted position and alternately when the door is in the raised position and the window is in the extended position, only enters the window driving mode when the door is in the raised position, and only enters the door driving mode when the window is in the retracted position.

16. A vehicle door moving apparatus according to claim 12 wherein the first, second and third electric clutches are aligned along a common axis.

17. A vehicle door moving apparatus according to claim 12 wherein the window drive means comprises a cable drive mechanism mounted on a common housing with the first, second and third electric clutches and the single prime mover means, and wherein the common housing is removable from the vehicle door as a complete unit.

18. A vehicle door moving apparatus for use in driving a vertically sliding door between a raised position and lowered position in conjunction with driving a window between an extended position and a retracted position relative to the door, wherein the door covers a portion of a door opening when in the raised position and is stowed below a vehicle floor exposing the door opening when in the lowered position, and wherein the window is located on and is movable with the door and retracts within the door when in the retracted position, the window cooperating with the door to cover the entire door opening when the door is in the raised position and the window is in the extended position, the apparatus comprising:

- an electric motor for providing power to move the door between the raised and lowered positions and to move the window between the extended and retracted positions;
- door drive shafts for directing the power from the electric motor to move the door;
- a window drive cable for directing the power from the electric motor to move the window;
- a first electric clutch which is normally uncoupled but which couples the electric motor to the door drive shafts when an electrical current is supplied to the first electric clutch;
- a second electric clutch which is normally uncoupled but which couples the electric motor to the window drive cable when an electrical current is supplied to the second electric clutch; and
- a third electric clutch which normally couples the door drive shafts to the window drive cable but which uncouples when an electrical current is supplied to the third electric clutch.

* * * * *